US010877862B2

United States Patent
Gao et al.

(10) Patent No.: US 10,877,862 B2
(45) Date of Patent: Dec. 29, 2020

(54) STORAGE SYSTEM MANAGEMENT

(71) Applicant: International Business Machines Corporation, Armonk, NY (US)

(72) Inventors: Yi Zhi Gao, Shanghai (CN); Li Hui Guo, Shanghai (CN); Long Wen Lan, Shanghai (CN); Wen Wu Na, Shanghai (CN); Yao Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/200,830

(22) Filed: Nov. 27, 2018

(65) Prior Publication Data
US 2020/0167251 A1    May 28, 2020

(51) Int. Cl.
*G06F 11/00* (2006.01)
*G06F 11/20* (2006.01)

(52) U.S. Cl.
CPC ...... *G06F 11/2094* (2013.01); *G06F 11/2033* (2013.01); *G06F 11/2069* (2013.01); *G06F 11/2082* (2013.01); *G06F 2201/805* (2013.01); *G06F 2201/82* (2013.01)

(58) Field of Classification Search
CPC ............. G06F 11/2069; G06F 11/2082; G06F 11/0727; G06F 11/2033; G06F 11/1662; G06F 11/1446; G06F 11/1658; G06F 11/006
See application file for complete search history.

(56) References Cited

U.S. PATENT DOCUMENTS

| 8,121,966 | B2 | 2/2012 | Routray et al. |
| 8,352,482 | B2 | 1/2013 | Hansen |
| 10,509,707 | B1* | 12/2019 | LeCrone ............... G06F 16/258 |
| 2015/0269042 | A1* | 9/2015 | Jain ..................... H04L 67/1034 |
| | | | 714/6.3 |
| 2015/0309892 | A1* | 10/2015 | Ramasubramaniam .................... |
| | | | G06F 11/2092 |
| | | | 714/4.5 |
| 2015/0331757 | A1 | 11/2015 | Durge et al. |
| 2016/0048408 | A1 | 2/2016 | Madhu et al. |
| 2016/0110240 | A1* | 4/2016 | Reger ................ G06F 11/0751 |
| | | | 714/37 |

OTHER PUBLICATIONS

Hunt, A., "vCloud Air Disaster Recovery Failover," http://www.vstellar.com/2017/03/13/vcloud-air-disaster-recovery-failover/, Mar. 13, 2017, 16 pgs.

(Continued)

*Primary Examiner* — Charles Ehne
(74) *Attorney, Agent, or Firm* — Robert J. Shatto

(57) ABSTRACT

Provided is a method, system, and computer program product for managing requests received by a storage system. The method may include detecting, by one or more processors, a failure in a first storage system in response to a request to access data in the first storage system. The first storage system may include a primary storage for storing the data. A second storage system may be activated in response to the detected failure. The second storage system may include a first storage and a second storage. The first storage may include data synchronized with the primary storage of the first storage system. The second storage may be used to store data that corresponds to the request. The request may be managed using the second storage system.

20 Claims, 7 Drawing Sheets

(56) References Cited

OTHER PUBLICATIONS

Druva, "Disaster Recovery for VMware," https://www.druva.com/products/phoenix/disaster-recovery-vmware/, printed Aug. 14, 2018, 8 pgs.

VMware, "VMware vSphere VMFS—Technical Overview and Best Practices," a VMware Technical White \Paper Updated for VMware vSphere 51, Version 3.0, https://www.vmware.com/content/dam/digitalmarketing/vmware/en/pdf/whitepaper/vmware-vsphere-vmfs-best-practices-whitepaper.pdf, © 2012, 17 pgs.

Goggle Code Archive, "Open Source VMFS Driver," Open Source Virtual Machine File System (VMFS) Driver, https://code.google.com/archive/p/vmfs/, printed Aug. 14, 2018, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

STORAGE SYSTEM MANAGEMENT

BACKGROUND

The present disclosure generally relates to storage system management. Specifically, the present disclosure relates to computer-implemented methods, computer-implemented systems, and computer program products for taking over functions of a first storage system by a second storage system.

Storage systems play important roles in almost every industry. In order to increase reliabilities of the storage systems, sometimes there may be multiple storage systems for providing storage service for users. Normally, data is synchronized among the multiple storage systems (for example, a local and a cloud storage system) to prevent a failure of one storage system. However, the formats of the multiple storage systems may be different, and sometimes the format of one storage system is unknown to the other. Even if the format is known, data conversion between the various formats may result in a low performance. Although several solutions are proposed for managing the failed storage system, how to take over the functions of the failed storage system and achieve a recovery in a more convenient and effective manner becomes a focus.

SUMMARY

Embodiments of the present disclosure include a computer-implemented method, system, and computer program product for managing a request. The method may include detecting, by one or more processors, a failure in a first storage system in response to a request to access data in the first storage system. The first storage system may include a primary storage for storing the data according to a first format. A second storage system having a second format may be activated in response to the detected failure. The second storage system may include a first storage and a second storage. The first storage may include data synchronized with the primary storage of the first storage system. The second storage may be used to store data that corresponds to the request. The request may be managed using the second storage system.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure. Throughout the drawings, same or similar reference numerals represent the same or similar elements

Figure 1:
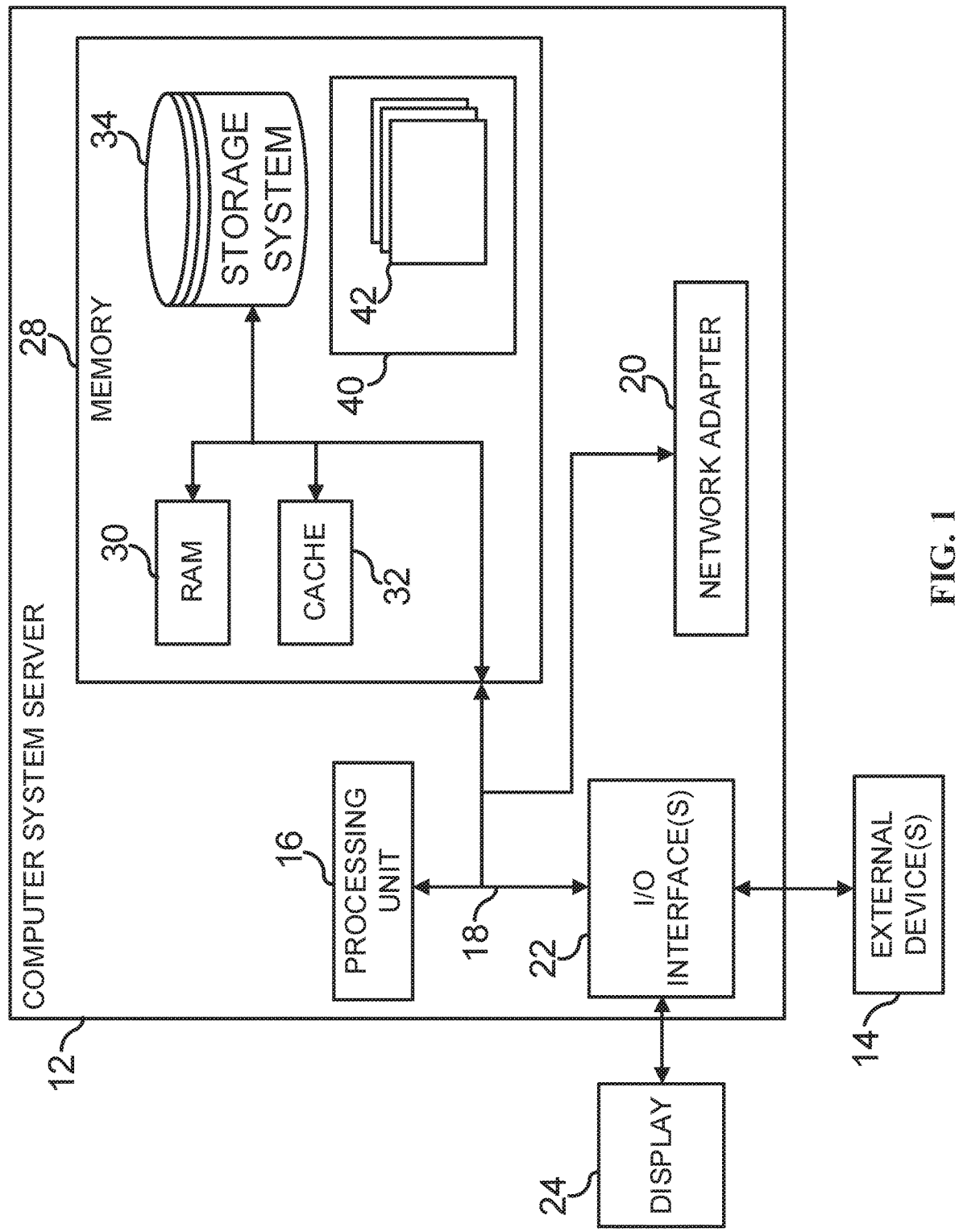
FIG. 1 depicts a cloud computing node according to an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer storage systems, and more particularly to taking over functions of a first storage system by a second storage system. While the present disclosure is not necessarily limited to such applications, various aspects of the disclosure may be appreciated through a discussion of various examples using this context.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node is only one example of a suitable cloud computing node and is not intended to suggest any limitation as to the scope of use or functionality of embodiments of the present disclosure described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
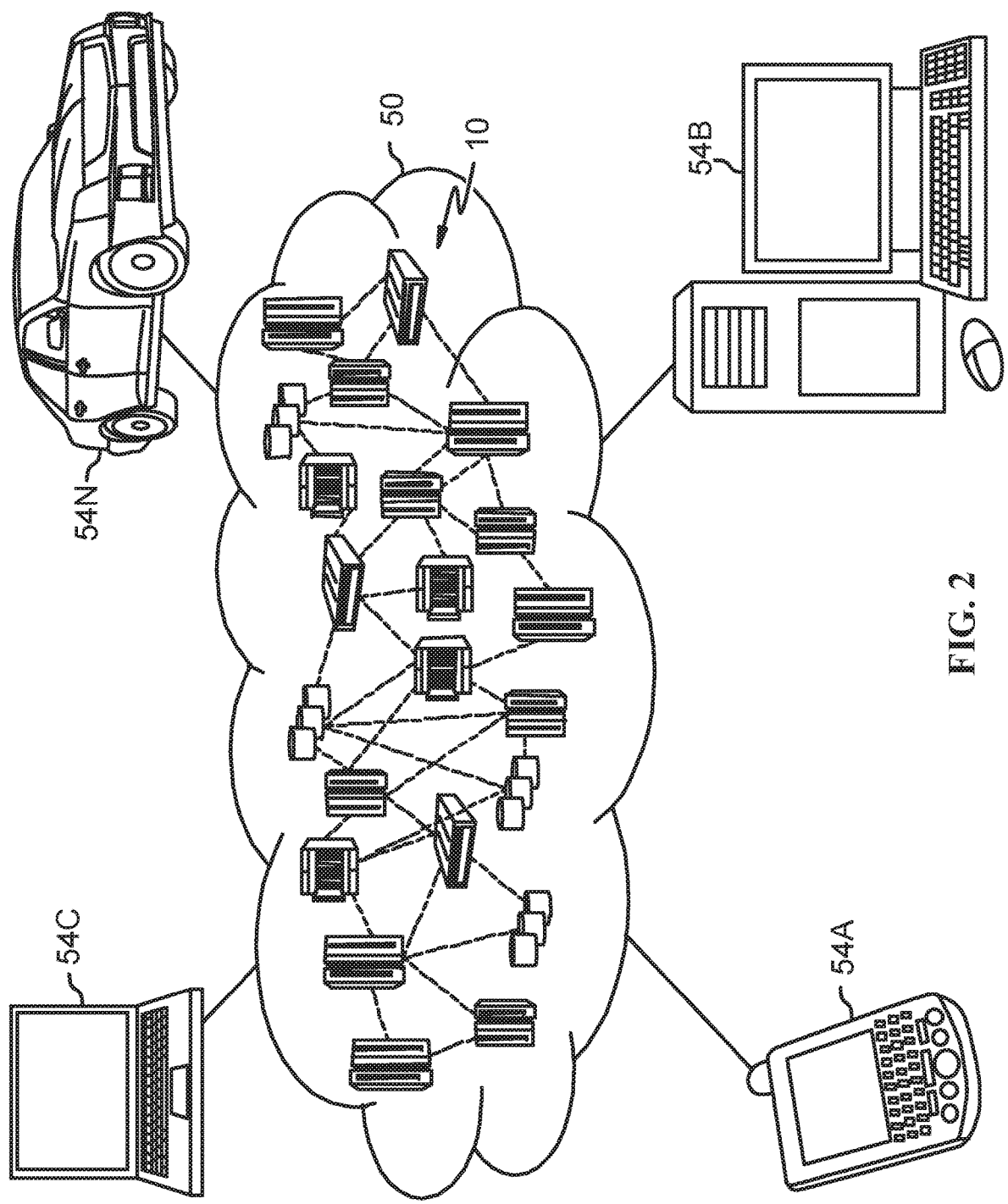
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
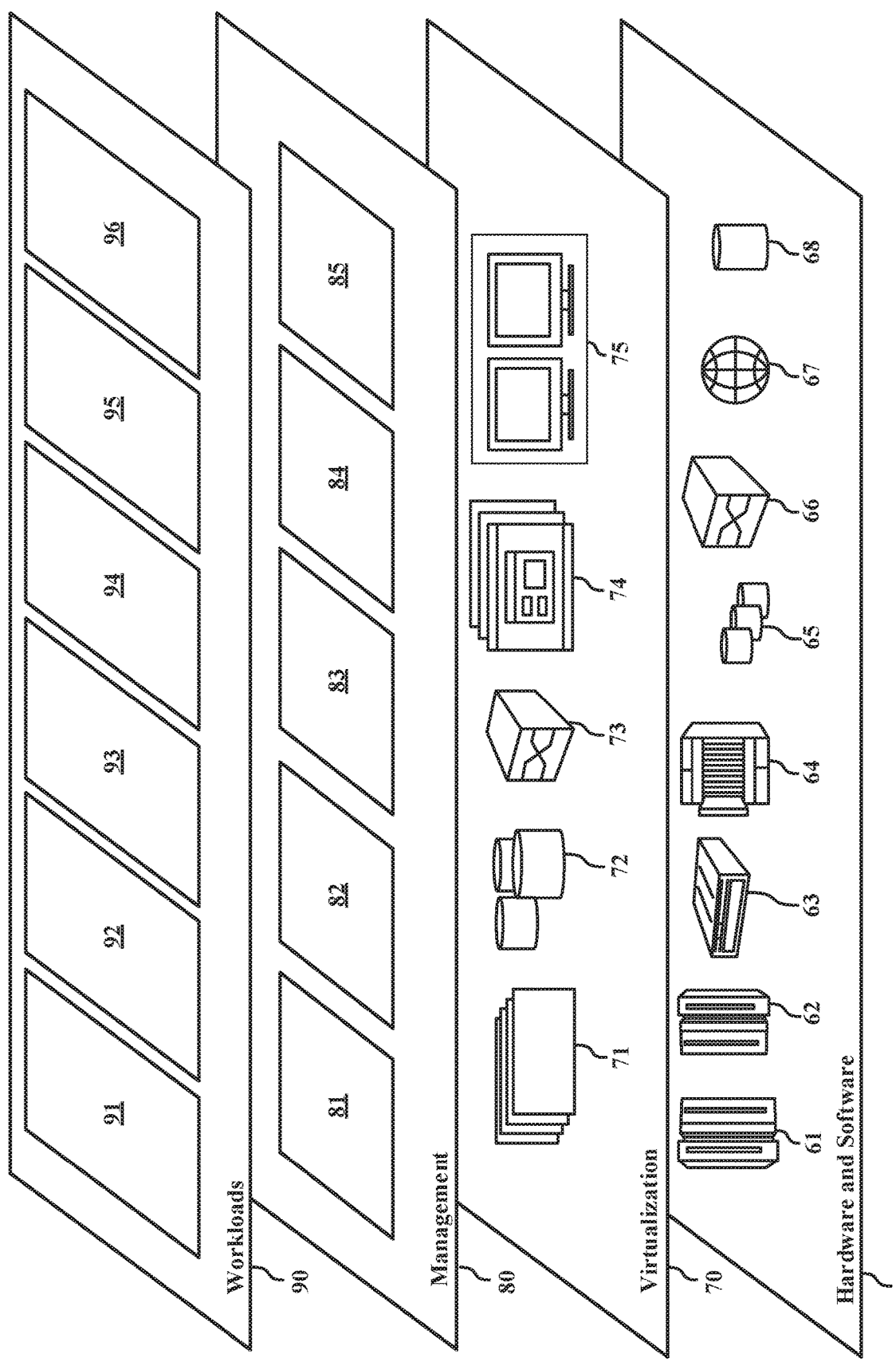
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing processing 96. Hereinafter, reference will be made to FIG. 4 to FIG. 9 to describe details of the managing processing 96.

Figure 4:
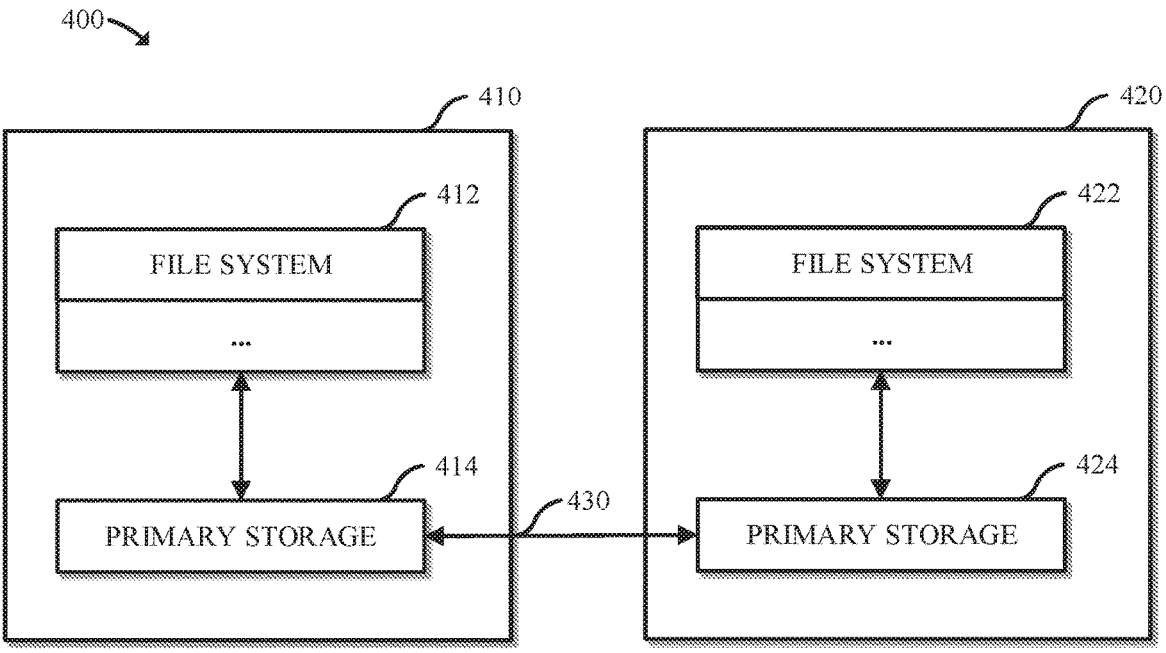
FIG. 4 depicts an example diagram of a first and a second storage system, in accordance with embodiments of the present disclosure.

FIG. 4 depicts an example diagram 400 of a first storage system 410 and a second storage system 420, in accordance with embodiments of the present disclosure. In the first storage system 410, a file system 412 may be included for providing data access service to the user. Below the file system 412, other intermediary components may be provided for communications between the file system 412 and the underlying physical storage such as the primary storage 414 in the first storage system 410. Depending on types of the first storage system 410, various software configurations may be provided. In one example, VMDK (VMWare® Virtual Machine Disk Format) and IBM® SAN Volume Control may be used in the first storage system 410. Similarly, the second storage system 420 may comprise a file system 422 and a primary storage 424.

Traditionally, data in the primary storage 414 of the first storage system 410 may be synchronized to the primary storage 424 of the second storage system 420 via a channel 430. When the first storage system 410 fails, the second storage system 420 can take over the functions of the first storage system 410. Several disaster recovery solutions are proposed to deal with the failure, so as to make sure that modifications to the second storage system 420 may be updated into the first storage system 410 after the failure is removed. According to one solution, a list of actions that are performed in the second storage system 420 may be recorded. After the failure in first storage system 410 is removed, the list of actions may be performed in the first storage system 410 to update the data stored therein to the latest version. However, it is a time-consuming job to perform the list of actions. According to another solution, a snapshot of the second storage system 420 may be transferred to the first storage system 410. When the data amount of the snapshot is great, it also need a long time for recovering the data in the first storage system 410.

In order to at least partially solve the above and other potential problems, a new method for storage system management is disclosed according to implementations of the present disclosure. For the sake of description, implementations of the present disclosure will be described by taking a first storage system (such as a local storage system) and a second storage system (such as a cloud storage system) as examples; however, it is to be understood that some embodiments of the present disclosure may performed in other types of storage systems (e.g., where both storage systems are local or where both storage systems are remote). It is to be understood that positions of the local and the cloud storage systems may be switched in some embodiments of the present disclosure.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 5:
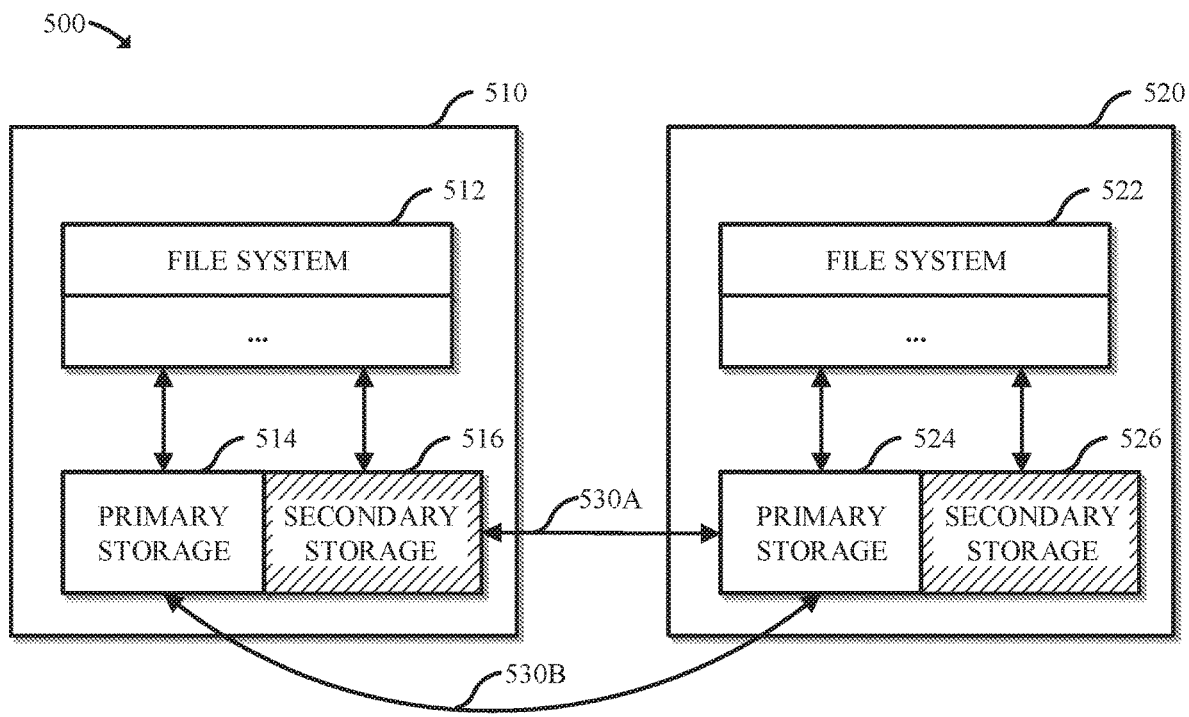
FIG. 5 depicts an example diagram of a first and a second storage system, in accordance with embodiments of the present disclosure.

Turning now to FIG. 5, depicted is an example diagram 500 of a first storage system 510 and a second storage system 520, in accordance with embodiments of the present disclosure. As shown in FIG. 5, the first storage system 510 may comprise a file system 512, a primary storage 514 and a secondary storage 516. Similarly, the second storage system 520 may comprise a file system 522, a primary storage 524 and a secondary storage 526. Here, the first and second storage systems 510 and 520 may store data in first and second formats, respectively. Normally, the first storage system 510 may provide data access service to the users, and the second storage system 520 may serve as a backup in case of a failure of the first storage system 510. Meanwhile, data in the primary storage 514 of the first storage system 510 may be synchronized to the primary storage 524 of the second storage system 520 via one or more channels (e.g., channel 530A and/or channel 530B, which may be the same or different channels). When a failure occurs in the first storage system 510, the second storage system 520 may take over functions of the first storage system 510, and requests that are sent to the first storage system 510 may be redirected to the second storage system 520. Here, the secondary storage 526 of the second storage system 520 may be used for storing data corresponding to the requests (e.g., the requests that are redirected to the second storage system 520). Reference will be made to FIGS. 5 to 9 to describe details of various embodiments of the present disclosure.

According to some embodiments of the present disclosure, the first storage system 510 may comprise a primary storage 514 for storing data of the user. When a request for accessing the first storage system 510 is received, the state of the first storage system 510 may be determined. Here, the request may be received from a user; in some embodiments, the request may be received from an application being installed on a processing device or from an application running on the processing device. If a failure is detected in the first storage system 510, the second storage system 520 may be activated. The second storage system 520 may comprise a primary storage 524 and a secondary storage 526, where the primary storage 524 may comprise data that is synchronized with the primary storage 514 of the first storage system 510, and the secondary storage 526 may be used for storing data corresponding to the request. During the failure of the first storage system 510, the request may be managed based on the second storage system 520.

In some embodiments, when there is a failure in the first storage system 510, the second storage system 520 may be automatically activated to take over the job of the first storage system 510. Further, all of data changed during the failure may be stored in the secondary storage 526 of the second storage system 520. Therefore, the present disclosure may provide a more convenient manner for managing the first and second storage systems 510 and 520.

Figure 6:
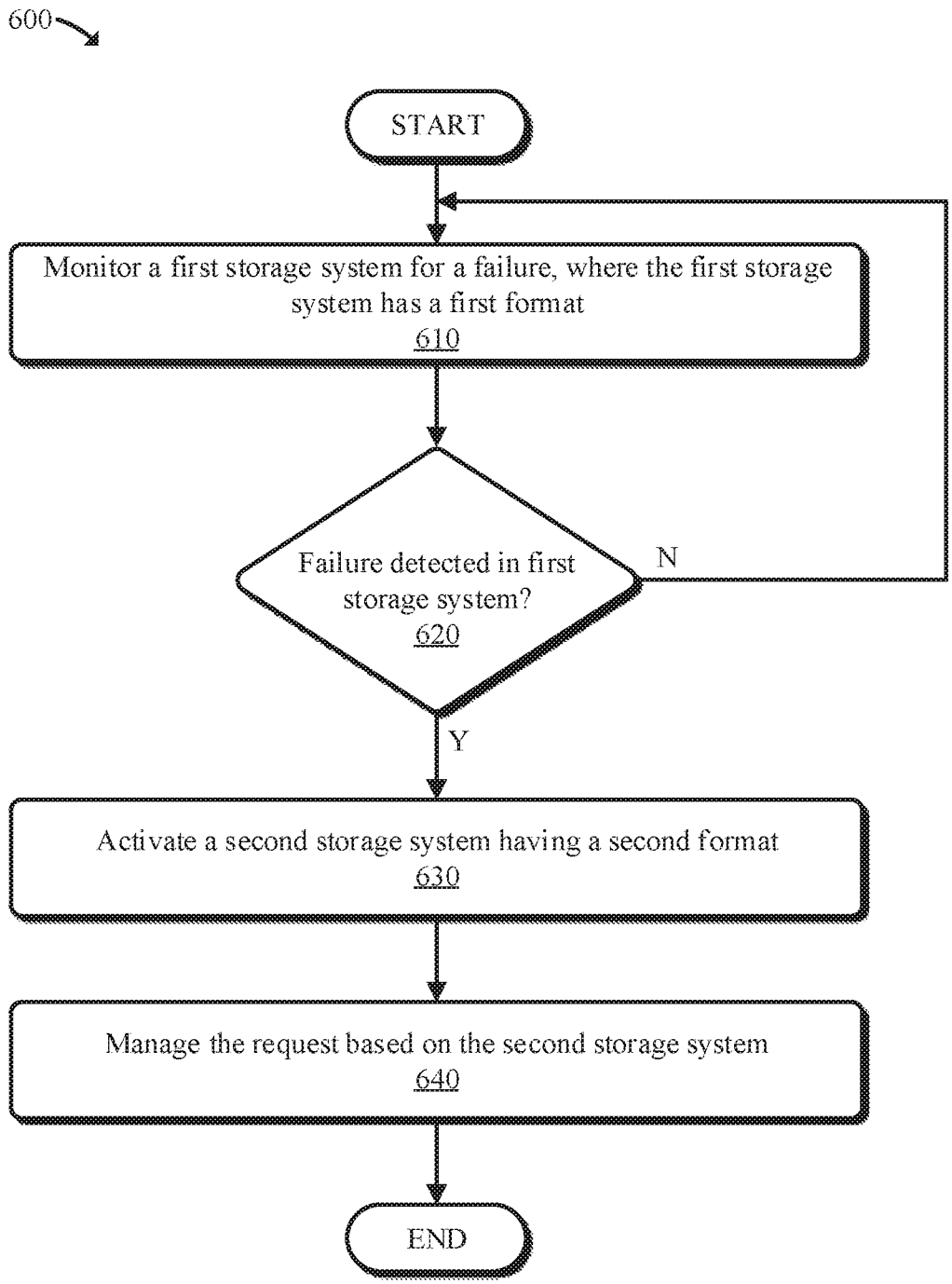
FIG. 6 depicts an example flowchart of a method for storage system management, in accordance with embodiments of the present disclosure.

FIG. 6 depicts an example flowchart of a method 600 for storage system management, in accordance with embodiments of the present disclosure. The method 600 may be implemented by one or more processors. As shown in FIG. 6, at a block 610, a first storage system may be monitored for a failure (e.g., an inability to respond to a data access request). The first storage system (e.g., first storage system 510) may comprise a primary storage (e.g., primary storage 514) for storing data of the user. The first storage system may have a first format. In some embodiments, monitoring the first storage system for a failure may include determining whether the first storage system is responding to, or is capable of responding to, requests to access data stored by the first storage system.

At decision block 620, a determination may be made as to whether there is a failure in the first storage system. The determination of whether there is a failure in the first storage system may be in response to a request to access data of the first storage system. If there is no failure detected, the first storage system may work normally and provide data access service to the user, and the method 600 may revert back to operation 610, where the first storage system may continue to be monitored for a failure (e.g., additional requests received by the first storage system may be monitored). In response to detecting a failure at decision block 620, a second storage system (e.g., second storage system 520) of a second format may be activated at a block 630. The second storage system may comprise a primary storage (e.g., primary storage 524) and a secondary storage (e.g., secondary storage 526). The primary storage of the second storage system may include data synchronized with the primary storage of the first storage system (e.g., primary storage 514), and the secondary storage of the second storage system may be used to store data corresponding to the request. In some embodiments, activating the second storage system may include redirecting the request to the second storage system, which may already be running. In some embodiments, the second storage system may already be running (e.g., to synchronize the data with the first storage system), and activating the second storage system may be changing the storage system that handles incoming requests from the first storage system to the second storage system. Further, the request may be managed based on the second storage system at a block 640, and the method 600 may end.

In some embodiments of the present disclosure, an address mapping may be recorded to describe an association of an address in the first storage system 510 and an address in the second storage system 520. For example, the first and the second storage systems 510 and 520 can be located on DEVICE1 and DEVICE2, respectively. When data at an address in the primary storage 514 of the first storage system 510 is changed in DEVICE1, the changed data is synchronized to the primary storage 524 of the second storage system 520 based on the address mapping.

In some embodiments of the present disclosure, a first format of the first storage system 510 may be different from a second format of the second storage system 520. The first storage system 510 may be organized in a private format which is defined according to a customized data structure, and the second storage system 520 may be organized in, for example, a public format. This may be the case when the first storage system 510 is an on-premise storage system and the second storage system 520 is a cloud-based storage system.

Figure 7A:
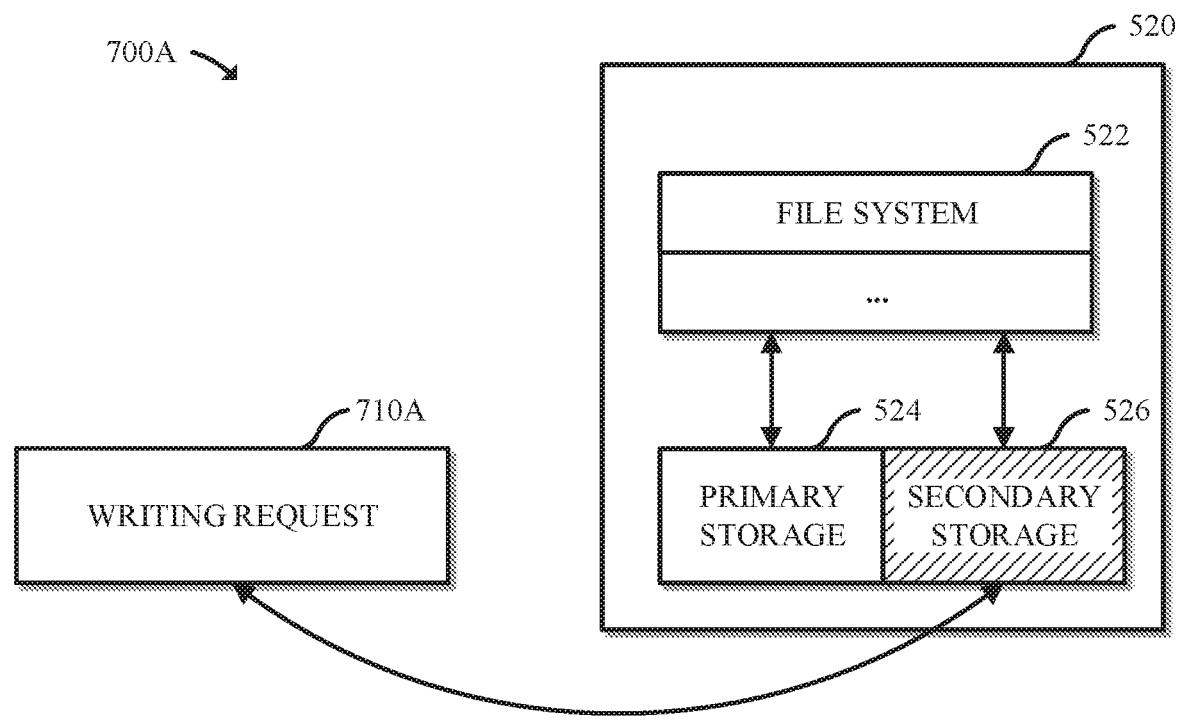
FIG. 7A depicts an example diagram for taking over functions of a first storage system by a second storage system, in accordance with embodiments of the present disclosure.
Figure 7B:
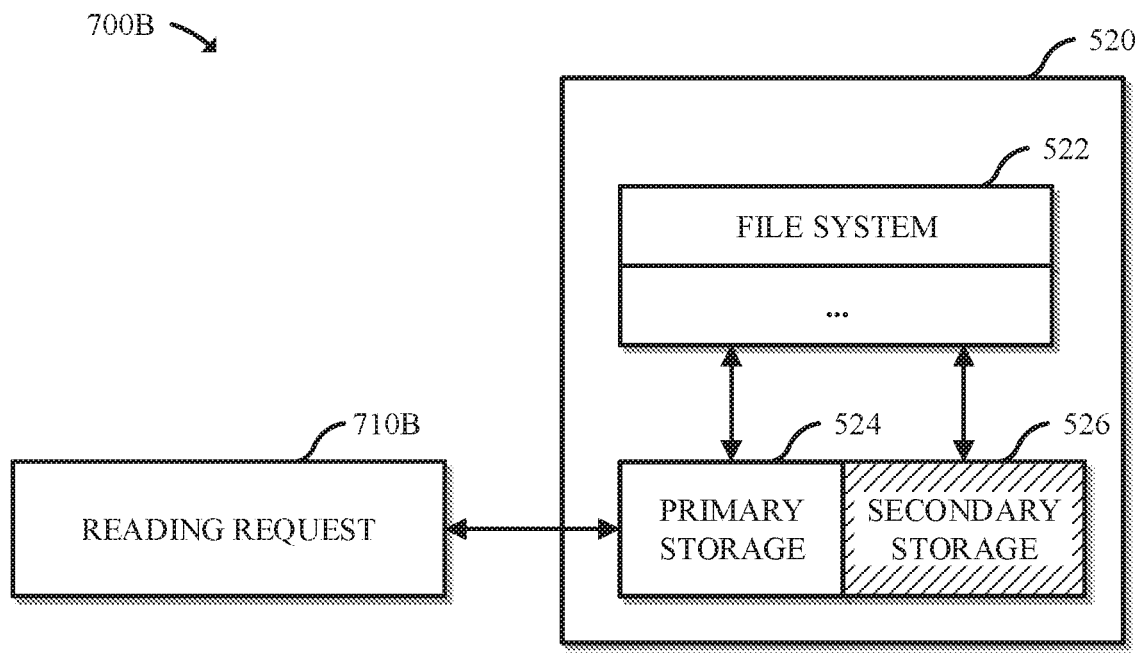
FIG. 7B depicts another example diagram for taking over functions of a first storage system by a second storage system, in accordance with embodiments of the present disclosure.

In some embodiments, if a request is received to access the failed first storage system 510, the type of the request may be determined first. Reference will be made to FIGS. 7A and 7B to describe how functions of the first storage system 510 may be handled by the second storage system 520 when a write request or a read request is received, respectively. FIG. 7A depicts an example diagram 700A for managing a write request 710A, in accordance with embodiments of the present disclosure. The write request 710A may be directed to the secondary storage 526 and data corresponding to the request may be written into the secondary storage 526 of the second storage system 520. In these embodiments, all the changes to the data in the second storage system 520 may be stored in the secondary storage 526.

In some embodiments, if the request is a write request, data corresponding to the request may be written into the secondary storage 526 of the second storage system 520 according to the second format, such as the public format. In these embodiments, during the failure, the data corresponding to the write request is written into the secondary storage 526 in the second format. When the failure of the first storage system 510 is removed (e.g., the first storage system becomes operational), the data in the second format may be converted into the first format and copied into the first storage system 510 for the recovery.

Although embodiments are discussed with the first format of the first storage system 510 being different from the second format of the second storage system 520, those skilled in the art would recognize that the first format may be the same as the second format. In embodiments where the first and second formats are the same, the converting process between the two formats may be omitted and other corresponding processes for handling read/write request may be similar to the discussed processes.

FIG. 7B depicts an example diagram 700B for managing a read request 710B, in accordance with embodiments of the present disclosure. If the read request 710B is for accessing data that has not been changed by a previous write request (such as the write request 710A), the read request 710B may be directed to the primary storage 524, and then data in the primary storage 524 of the second storage system 520 may be returned to reply the read request 710A. As the primary storage 524 is already synchronized with the primary storage 514 of the first storage system 510, the primary storage 524 includes the latest version of the to-be-read data. If a new read request for accessing data that has been changed by a previous write request is received, then the new read request may be directed to the secondary storage 526 as opposed to the primary storage 524. In some embodiments, all changes to the second storage system 520 may be stored into the secondary storage 526.

Figure 8:
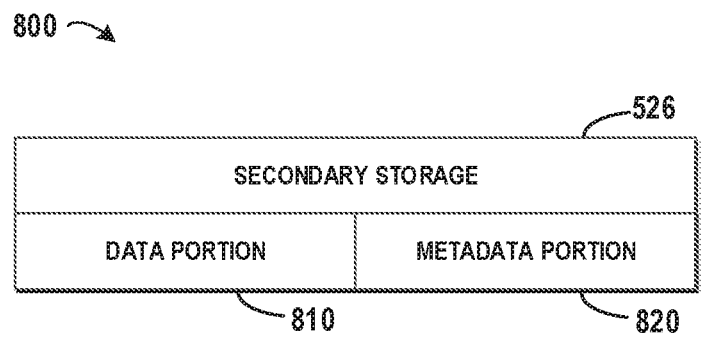
FIG. 8 depicts an example data structure of a secondary storage of the second storage system, in accordance with embodiments of the present disclosure.

Reference will be made to FIG. 8 to describe details of how to manage the write request 710B. FIG. 8 depicts an example data structure 800 of a secondary storage 526 of the second storage system 520, in accordance with embodiments of the present disclosure. In FIG. 8, the secondary storage 526 may comprise two portions: a data portion 810 for storing the data corresponding to a write request to the second storage system 520; and a metadata portion 820 for indicating whether a change has been made to data at a location corresponding to a write request in the primary storage 524 of the second storage system 520 during the failure. When a further request is received to access the second storage system 520, the metadata 820 may be used to direct the request to the latest version of the to-be-accessed data.

Continuing the above example, if the write request 710A is received, data corresponding to the write request 710A may be written into the secondary storage 526 of the second storage system 520. Further, the metadata 820 may be updated to indicate a change is to be made to data at a location corresponding to the write request 710A in the primary storage 524 of the second storage system 520 during the failure. It is to be understood that the above writing and updating procedures may be implemented successively or in parallel. In some embodiments, the change may be written into the data portion 810 of the secondary storage 526, and a flag may be recorded in the metadata 820 for indicating that the latest version of the data at the location corresponding to the write request 710A is stored in the secondary storage 526 instead of the primary storage 524.

Figure 9:
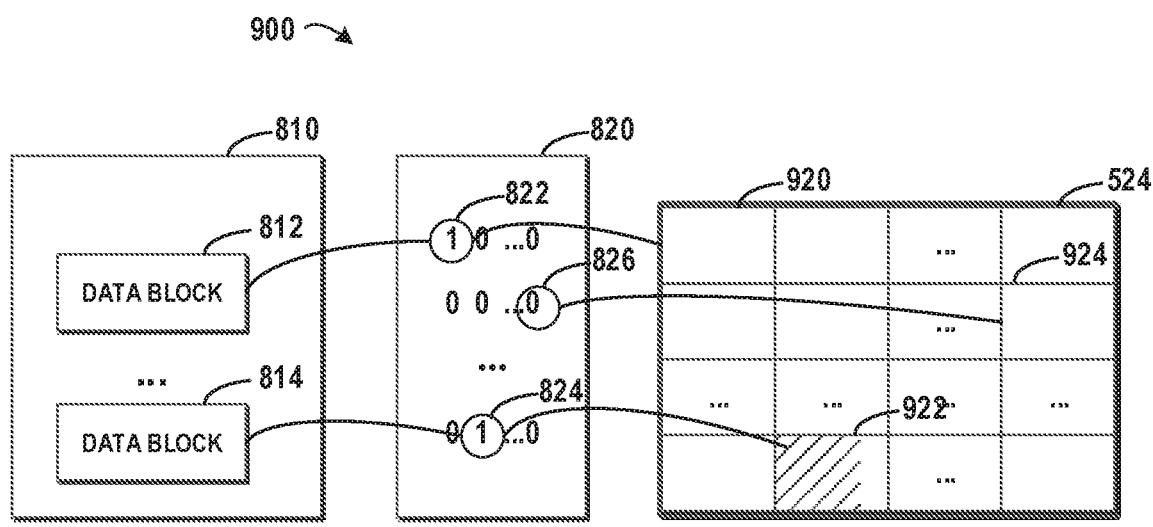
FIG. 9 depicts an example diagram of a relationship among data in the data portion and metadata of the secondary storage, in accordance with embodiments of the present disclosure.

Reference will be made to FIG. 9 for details about how embodiments of the present disclosure write data into the second storage system 520 during the failure of the first storage system 510. FIG. 9 depicts an example diagram 900 of a relationship among the data portion 810 and the metadata 820 of the secondary storage 526, in accordance with embodiments of the present disclosure. As depicted in FIG. 9, the data portion 810 may include one or more data blocks associated with one or more write requests processed during the failure. For example, the data portion 810 may include data blocks 812 and 814. Further, the primary storage 524 of the second storage system 520 that is shown with bold frame may include multiple blocks, where the shaded blocks such as blocks 920 and 922 represent data that has been changed (here the changed data is stored in the blocks 812 and 814), and the blank blocks such as a block 924 represent data that has not been changed. In some embodiments, the metadata 820 may be formatted in a bitmap, and each bit in the bitmap may indicate whether data at a corresponding block in the primary storage 524 is to be changed or not.

When the write request 710A is received, data corresponding to the write request 710A may be written into the data block 812 in the secondary storage 526 of the second storage system 520. Further, a bit 822 in the metadata 820 may be updated (for example, from 0 to 1) to indicate that a change should be made to data at a block 920 corresponding to the write request 710A in the primary storage 524 of the second storage system 520 during the failure. In some embodiments, a mapping among the data block 812, the bit 822 and the block 920 may be recorded. At this point, by checking the value of the bit 822, the actual location (as shown by the data block 812) of the latest version of the data at block 920 may be determined. Sometimes, more than one data block may be written into the data portion 810. In one example, a data block 814 may be written into the data portion 810 and a bit 824 may be written into the metadata 820 to indicate a change at a block 922. Here, a mapping among the data block 814, the bit 824 and the block 922 may be recorded.

Although this paragraph describes recording the mappings for the blocks that are changed, mappings may be recorded for all the blocks in the primary storage 524. For example, a mapping between the bit 826 and the block 924 may be recorded, even though there has been no change to bit 826 or block 924. It is to be understood that, for an unchanged data block, the mapping may comprise only two items: the bit in the metadata 820 and the data block in the primary storage 524.

The above paragraph describes the procedure for the write request, and reference will also be made to FIG. 9 to describe how to manage a read request during the failure. In some embodiments of the present disclosure, if a read request 710B is received, a target location associated with a reading location corresponding to the read request 710B may be determined based on the metadata 820. Then, data at the target location may be returned as a response to the read request 710B. Following the example shown in FIG. 9, as the metadata 820 records whether the data at the requested location is changed or not, the metadata 820 may be used as a base for determining a destination to which the request is directed.

In some embodiments of the present disclosure, when the metadata indicates a change is made to data at the reading location, it means that the latest version of the requested data is stored in the secondary storage 526 of the second storage system 520. Therefore, the target location for the read request (e.g., the location from which data will be read) may be set to a location that corresponds to the reading location in the secondary storage 526 of the second storage system 520. Accordingly, the metadata may lead the request to the latest version of the requested data. For example, if the read request 710B aims at reading data at the location 920, by checking the value of the bit 822, it may be determined that the data at the location 920 is not the latest version and the latest version is stored in the data block 812 in the data portion 810 of the secondary storage 526. As a response to the read request 710B, the data block 812 may be read and returned to the user.

In some embodiments of the present disclosure, when the metadata indicates no change is made to data at the reading location, it means that latest version of the requested data is stored in the primary storage 524 of the second storage system 520. Therefore, the target location may be set to a location that corresponds to the reading location in the primary storage 524 of the second storage system 520. For example, if the read request 710B aims at reading data at the block 924, by checking the value "0" of the bit 826 corresponding to the block 924, it may be determined that the data at the block 924 is the latest version. As a response to the read request 710B, the data block 924 in the primary storage 524 may be read and returned to the user.

In some embodiments of the present disclosure, after the failure of the first storage system 510 is detected, various trouble shooting procedures may be implemented to fix the first storage system 510. Further, if the failure is removed, data in the first storage system 510 may be recovered using the second storage system 520. In other words, once the failure is removed, the data in the second storage system 520 may be synchronized to the first storage system 510, and the first storage system 510 may resume handling requests. For example, where the secondary storage 526 of the second storage system 520 stores the latest version of the data that is changed during the failure, only the data in the secondary storage 526 of the second storage system 520 should be copied to the first storage system 510 for the recovery.

In some embodiments of the present disclosure, the first storage system 510 may further comprise the secondary storage 516, and data in the secondary storage 526 of the second storage system 510 may be converted from the second format to the first format and then copied into the secondary storage 516 of the first storage system 510. Then, the copied data may be merged into the primary storage 514 of the first storage system 510. With the above implementation, both secondary storages 516 and 526 may be used to store the latest version of the data that has been changed during the failure. Sometimes, during the recovery of the first storage system 510, data access request(s) may be received. As these requests may disturb the recovery procedure, processing of data access requests may be temporarily stopped (e.g., suspended) during the recovery. Depending on whether the service of the first storage system 510 should be stopped, an offline and an online mode may be provided.

In some embodiments, the data that is changed during the failure is converted from the second format to the first format, and then the converted data is merged into the primary storage 514 of the first storage system 510 for recovering the first storage system 510.

In some embodiments of the present disclosure, the first storage system 510 may be recovered in an offline mode. Here, the offline mode means that the service of the first storage system 510 should be temporarily stopped during the recovery. Specifically, a manager application that is used for managing data access to the first storage system 510 may be assigned to merge the data. After the data is successfully merged, the manager application may be resigned to manage the data access to the first storage system 510. With the above implementation, as the manager application is exclusively working on merging the data, new requests to the first storage system 510 have to be suspended, thereby a conflict between an operation triggered by the new request and the recovery may be easily avoided.

In the offline mode, the data in the secondary storage 526 of the second storage system 520 may be converted from the second format to the first format and copied to the secondary storage 516 of the first storage system 510. In the environment where the VMware Virtual Machine (VM) is adopted in the first system storage 510, the VM which is used for managing the data access requests may function as the manager. At this point, the primary storage 514 and the secondary storage 516 may be mounted to the VM. Then, the data in the secondary storage 516 may be merged into the primary storage 514 by the VM according to a mapping in the first storage system 510 during a merging procedure. Here, the mapping in the first storage system 510 is similar as those in the second storage system 520 described in the above paragraphs, and details will be omitted hereinafter. At this point, as the VM is assigned to control the merging procedure, the data access requests received during the merging may be suspended temporarily during the merging procedure. In one implementation, the suspended requests may be queued, and when the first storage system 510 is recovered, the queued requests may be processed.

In some embodiments, the merging procedure may be a reverse procedure of the writing procedure as depicted in FIG. 9. For example, if a bit in the metadata 820 in the secondary storage 516 is set to "1," it may indicate that the data corresponding to the bit has been changed during the failure. Thus, the data block corresponding to the bit may be merged from the secondary storage 516 into the primary storage 514. Here, the merging procedure may be controlled by the VM. As this VM devotes all its resources to the recovery procedure and the data access requests are suspended, the conflict between the recovery and the data access may be removed. If a bit in the metadata 820 in the secondary storage 516 is set to "0," it may indicate that the data corresponding to the bit has not been changed during the failure. Thus, the data block in the primary storage 514 corresponding to the bit is the latest version, and no more copy will be implemented to the data. After all the data is merged into the primary storage 514 of the first storage system 510, data in the primary storage 514 is the latest version. At this point, the VM has finished the recovery procedure and may be reassigned to process the queued requests. Once the recovery procedure is finished, the metadata 820 may be cleaned and implementations of the first and second storage systems return to the normal operation mode.

In some embodiments of the present disclosure, the first storage system 510 may be recovered in an online mode, and the service of the first storage system 510 may not be interrupted by the recovery. Here, the online mode means that the service of the first storage system 510 may continue during the recovery. Whenever a read request for accessing data that is changed during the failure is received, the to-be-accessed data may be recovered from the second storage system 520 to the first storage system 510. In other words, the recovery procedure is implemented during the reading procedure, thereby it may ensure that the first storage system 510 may continuously work without a stop for the recovery.

In the online mode, when a read request is received, a location at which the latest version of the target data corresponding to the read request may be determined based on the metadata. If the metadata indicates data at a target location associated with the read request is changed, then data at the target location may be converted from the second format to the first format and copied from the secondary storage of the second storage system into the secondary storage of the first storage system. Meanwhile, the copied data may be returned to the user. Afterwards, the copied data may be merged into the primary storage 514 of the first storage system 510.

In the online mode, the secondary storage 526 may be imported into the first storage system 510 as a local volume in the VM for managing the first storage system 510. In one example, both of the data portion 810 and the metadata 820 of the secondary storage 526 may be imported, for example, via an Internet Small Computer System Interface (iSCSI) connection. Then, configurations which specify the local volume (such as the primary storage 514 and the secondary storage 516) and the iSCSI volume (such as the secondary storage 526) may be set up. Then, the VM may determine the location of the latest version of the requested data.

In the online mode, if the metadata indicates data at a target location corresponding to the read request is changed, then the latest version is stored in the secondary storage 526. Data at the target location from the secondary storage 526 of the second storage system 520 may be converted from the second format to the first format and copied into the secondary storage 516 of the first storage system 510. Next, the copied data may be merged into the primary storage 514 of the first storage system 510 and then returned to the user. If a write request is received, then data corresponding to the write request will directly be written into the primary storage 514 at a location corresponding to the write request.

In some embodiments of the present disclosure, for data in the secondary storage 526 of the second storage system 520 that is not accessed by any read request, a background recovery may be performed. Specifically, the data may be converted and copied into the secondary storage 516 of the first storage system 510, and then the copied data may be merged into the primary storage 514 of the first storage system 510. With this implementation, data that is not accessed by a request may be recovered from the second storage system 520 into the first storage system 510.

With the above embodiments, all the data in the secondary storage 526 of the second storage system 520 may be gradually copied and then merged into the first storage system 510. As the data may not result in a conflict in the first storage system, the background recovery for the data may not interrupt the normal operation of the first storage system 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer-implemented method, comprising:
    detecting, by one or more processors, a failure in a first storage system of a first format in response to a request to access data in the first storage system, wherein the first storage system comprises a primary storage for storing the data;
    activating a second storage system of a second format in response to detecting the failure, wherein the first format is different from the second format, the second storage system comprises a first storage and a second storage, the first storage comprises data synchronized with the primary storage of the first storage system, and the second storage is used to store data corresponding to requests,
    wherein the second storage further comprises metadata indicating whether a change has been made to the data corresponding to the request at a location in the first storage during the failure; and
    managing the request using the second storage system.

2. The method of claim 1, wherein managing the request comprises:
    writing data corresponding to the request into the second storage according to the second format in response to the request being a write request.

3. The method of claim 1, wherein managing the request further comprises, in response to the request being a read request:
    determining a target location associated with a reading location corresponding to the read request based on the metadata; and
    returning the data at the target location.

4. The method of claim 3, wherein determining the target location comprises:
    in response to the metadata indicating a change has been made to the data at the reading location, identifying a location in the second storage that corresponds to the reading location as the target location; and
    in response to the metadata indicating that no change has been made to the data at the reading location, identifying a location in the first storage that corresponds to the reading location as the target location.

5. The method of claim 1, the method further comprising:
    recovering the data in the first storage system based on the second storage system in response to a determination that the first storage system has been recovered from the failure.

6. The method of claim 5, wherein the first storage system further comprises a secondary storage, and recovering the data in the first storage system comprises:
    converting the data in the second storage of the second storage system from the second format to the first format;
    copying the converted data into the secondary storage of the first storage system; and
    merging the copied data into the primary storage of the first storage system.

7. The method of claim 6, the method further comprising:
    managing a further request using the first storage system in response to a completion of the merging of the data.

8. The method of claim 5, wherein the first storage system further comprises a secondary storage, and recovering the data in the first storage system comprises:
    receiving a read request for reading data at a reading location in the first storage system;
    in response to the metadata indicating that a change has been made to the data at a target location in the second storage system associated with the reading location,
    converting the data at the target location from the second format to the first format;
    returning the converted data;
    copying the converted data into the secondary storage of the first storage system; and
    merging the copied data into the primary storage of the first storage system.

9. The method of claim 8, wherein recovering the data in the first storage system further comprises, with respect to data in the second storage of the second storage system that has not been accessed:
    converting the data that has not been accessed from the second format to the first format;
    copying the converted data into the secondary storage of the first storage system; and
    merging the copied data into the primary storage of the first storage system.

10. The method of claim 1, wherein detecting the failure in the first storage system comprises determining that the first storage system is not responding to the request.

11. A system comprising:
    a memory; and
    a processor communicatively coupled to the memory, wherein the processor is configured to perform a method comprising:
    detecting a failure in a first storage system of a first format in response to a request to access data in the first storage system, wherein the first storage system comprises a primary storage for storing the data;
    activating a second storage system of a second format in response to detecting the failure, wherein the first format is different from the second format, the second storage system comprises a first storage and a second storage, the first storage comprises data synchronized with the primary storage of the first storage system, and the second storage is used to store data corresponding to requests,
    wherein the second storage further comprises metadata indicating whether a change has been made to the data corresponding to the request at a location in the first storage during the failure; and
    managing the request using the second storage system.

12. The system of claim 11, wherein managing the request comprises:
   writing data corresponding to the request into the second storage according to the second format in response to the request being a write request.

13. The system of claim 11, wherein managing the request further comprises, in response to the request being a read request:
   determining a target location associated with a reading location corresponding to the read request based on the metadata; and
   returning the data at the target location.

14. The system of claim 13, wherein determining the target location comprises:
   in response to the metadata indicating a change has been made to the data at the reading location, identifying a location in the second storage that corresponds to the reading location as the target location; and
   in response to the metadata indicating that no change has been made to the data at the reading location, identifying a location in the first storage that corresponds to the reading location as the target location.

15. The system of claim 11, wherein the method further comprises:
   recovering the data in the first storage system based on the second storage system in response to a determination that the first storage system has been recovered from the failure.

16. The system of claim 15, wherein the first storage system further comprises a secondary storage, and recovering the data in the first storage system comprises:
   converting the data in the second storage of the second storage system from the second format to the first format;
   copying the converted data into the secondary storage of the first storage system; and
   merging the copied data into the primary storage of the first storage system.

17. The system of claim 16, wherein the method further comprises:
   managing a further request using the first storage system in response to a completion of the merging of the data.

18. The system of claim 15, wherein the first storage system further comprises a secondary storage, and recovering the data in the first storage system comprises:
   receiving a read request for reading data at a reading location in the first storage system;
   in response to the metadata indicating that a change has been made to the data at a target location in the second storage system associated with the reading location,
   converting the data at the target location from the second format to the first format;
   returning the converted data;
   copying the converted data into the secondary storage of the first storage system; and
   merging the copied data into the primary storage of the first storage system.

19. A computer program product comprising a computer readable storage medium having program instructions embodied therewith, the program instructions executable by a processor to cause the processor to perform a method comprising:
   detecting a failure in a first storage system of a first format in response to a request to access data in the first storage system, wherein the first storage system comprises a primary storage for storing the data;
   activating a second storage system of a second format in response to detecting the failure, wherein the second storage system comprises a first storage and a second storage, the first storage comprises data synchronized with the primary storage of the first storage system, and the second storage is used to store data corresponding to requests,
   wherein the second storage further comprises metadata indicating whether a change has been made to the data corresponding to the request at a location in the first storage during the failure; and
   managing the request using the second storage system.

20. The computer program product of claim 19, the method further comprising, in response to the first storage system recovering from the failure:
   copying data from the second storage of the second storage system to a secondary storage of the first storage system; and
   merging the data from the secondary storage of the first storage system to the primary storage of the first storage system.

* * * * *